July 22, 1947.  C. ELVY  2,424,309
TEMPORARY HOLDING PIN
Filed Nov. 23, 1943
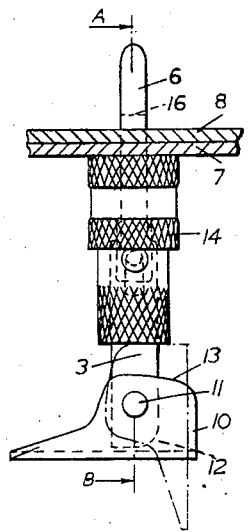
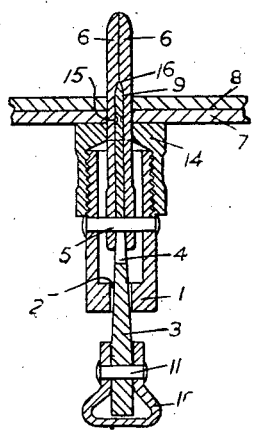
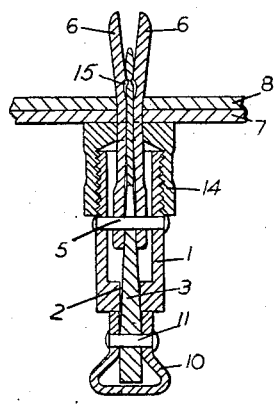
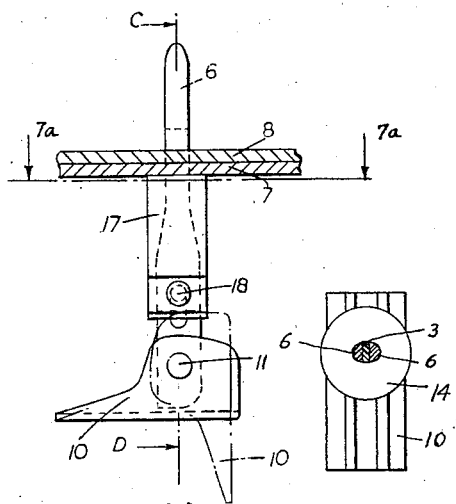
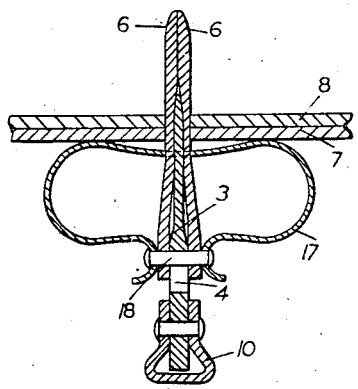
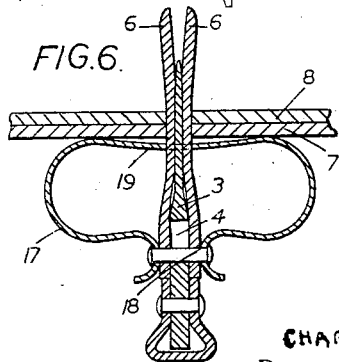
Inventor
CHARLES ELVY.
By Haseltine, Lake
Attorneys.

Patented July 22, 1947

2,424,309

UNITED STATES PATENT OFFICE 2,424,309

TEMPORARY HOLDING PIN

Charles Elvy, Rainham, Gillingham, England

Application November 23, 1943, Serial No. 511,410
In Great Britain June 16, 1943

5 Claims. (Cl. 85—6)

This invention relates to pins for locating and holding in position metal plates or the like during riveting or other operations, the pins being inserted in aligned holes in the plate and member to which the plate is to be secured, thereby temporarily maintaining the plate firmly in its correct position. For example, in the case of a plate in which all the holes to receive rivets, screws or the like are already drilled in the plate and corresponding holes drilled in the plate receiving member, the pin will not only maintain the holes through which it is passed in correct register but all the remaining holes in register assuming, of course, that they have been accurately drilled.

The present invention is concerned with an improvement in or modification of the locating pin forming the subject of my prior British Patent No. 533,984, the locating pin according to the prior patent comprising a casing, a pin proper fixedly located within said casing and projecting from one end thereof and built up from two or more substantially parallel resilient members, said pin proper being of circular shape and when the parts were in parallel relationship of such a diameter that it could be inserted in the holes in the plate and plate receiving member, and a plunger freely slidable axially of the casing and located between the parts of the pin proper, said parts being cut away on their inner surfaces to accommodate the extremity of the plunger and form inclined cam like surfaces with which the extremity of the plunger engaged, the extremity of the plunger being tapered for the purpose of causing the parts to diverge as a result of the interengagement of the tapered extremity of the plunger with the cam like surfaces, upon the plunger being slid inwardly towards the plate when the pin was in its operative position within the holes, the divergence of the parts being such that they engaged the edges of the holes and thereby not only maintain the pin in position but also the plate in contact with the plate receiving member with the holes in correct alignment.

The preferred form of locating pin constructed in accordance with the above numbered patent included a plunger fitted with an enlarged head by means of which it could be moved into its operative and inoperative positions.

Objects of the present invention are to facilitate and expedite insertion and removal of the locating pin.

Referring to the drawings.

Figure 1 illustrates one form of locating pin, in accordance with the invention, the locating pin having been inserted in aligned holes in a plate and frame member to which the plate is secured, the pin however being shown in its inoperative position.

Figure 2 is a sectional view on the line A—B in Figure 1.

Figure 3 is a sectional view similar to Figure 2 but illustrating the pin in its operative position.

Figures 4, 5 and 6 are views corresponding to Figures 1, 2 and 3 but illustrating a modified form of locating pin, Figure 5 being a section on the line C—D in Figure 4, and Figure 7 is a section on the line 7a—7a of Figure 4.

The locating pin illustrated by Figures 1 to 3, comprises a tubular externally screw threaded casing 1 having a rectangular hole 2 at one end for the passage of a plunger 3 of rectangular cross-sectional shape, the plunger 3 being formed with a longitudinally arranged slot 4 for the passage of a rivet or like member 5 passing diametrically through the casing, which rivet serves to locate the plunger therein but at the same time permits the plunger to have a certain amount of movement in a longitudinal direction.

The plunger wedging member 3 projects at both ends of the casing and is of a tapering construction for the purpose hereinafter referred to. Disposed on opposite sides of the plunger 3 and secured within the casing by the rivet 5, are the component parts 6 forming the pin proper, the parts being formed from steel or other suitable metal and substantially as in the specification of my prior British Patent No. 533,984, each part being of semi-circular or part-circular shape at and near its extremity, so that when the parts are in contact, the pin proper is of substantially circular shape and is of a diameter appropriate to the diameter of the aligned holes in the plate 7 and frame member 8, the pin proper fitting snugly within the holes and occupying the position shown in Figures 1 and 2 when initially inserted. The substantially flat inner surfaces of the parts 6 are cut away to accommodate the plunger and are slightly inclined as at 9 to provide cam surfaces which are engaged by the tapering part of the plunger 3 when the latter is moved into its operative position, that is to say, into the position shown in Figure 3, thus causing the parts 6 to diverge at their ends and to engage firmly the metal plate and plate receiving member or frame where the parts 6 pass through the aligned holes formed in those members, the holes being thereby maintained in correct alignment, the diverging relationship of the parts 6 at the same time causing the metal plate to be held firmly in contact with the frame to which it is to be riveted.

The plunger is fitted with a cam like lever 10 which may be conveniently pressed up from sheet metal and riveted or otheriwse secured to the plunger, a rivet 11 being shown passing through the side members of the lever and plunger. The lever 10 has a limited amount of pivotal movement approximating 90°, the lever being movable in an anti-clockwise direction from the position illustrated, one corner of the plunger being curved to permit of such pivotal movement. Pivotal movement of the lever in a clockwise direction is prevented by the interengagement of the square corner of the plunger with the inner surface of the lever.

The lever 10 provides a convenient thumb piece for use when inserting the locating pin and moving the plunger into the position shown in Figure 3. As will be seen from Figure 3 the upper edges of the lever 10 engage the end surface of the casing, and to facilitate withdrawal of the plunger from the position shown in Figure 3 into the position shown in Figures 1 and 2 when it is desired to remove the locating pin, the lever 10 is formed with cam surfaces 13 on its upper edges, the arrangement being such that when the lever 10 is turned in an anti-clockwise direction through substantially 90°, the cam surfaces 13 bear on the adjacent end of the casing and cause the plunger to be withdrawn, withdrawal of the plunger permitting the parts 6 by virtue of their resilient construction to return to the position they occupy in Figures 1 and 2, thus enabling the locating pin to be withdrawn from the aligned holes in the plate and frame, the parts 6 again assuming their straight formation as distinct from the bowed shape which they hitherto assumed under the action of the plunger.

Although it is within the scope of the invention to fit the casing at the end opposite to that formed with the rectangular hole for the passage of the plunger, with a closure member having a circular hole for the passage of the parts 6, it is preferred that the casing shall be fitted with an adjustable knurled nut 14, the latter being internally screw threaded to engage the corresponding external screw threads on the casing, the arrangement being such that upon the nut 14 being rotated in the appropriate direction, when the parts occupy the position shown in Figure 3, the end of the nut will press firmly on the adjacent surface of the plate, thus tending to effect withdrawal of the diverging parts 6 from the aligned holes, the result being that the diverging parts 6 will press more firmly on to the adjacent frame member, the frame being thus in its turn pressed more firmly into contact therewith. When such a nut is provided, it is desirable to slacken the nut slightly before attempting to remove the locating pin, the nut when tightened up serving to retain the pin firmly in position, and the plate and frame pressed firmly together, notwithstanding the fact that the frame and plate may be subjected to considerable vibration as a result of the riveting or other process employed for securing the plate in position.

To prevent the adjusting nut 14 being lost either in transit or in the tool box or being moved from its operative position as the result of vibration, the axial hole formed for the passage of the parts 6 may be slightly elliptical in shape, as shown in Figure 7 and the parts so arranged that they tend to spring outwardly into the opposite ends of the major axis of the ellipse, thereby providing a friction lock every time the nut is turned through a half revolution. The plunger at the point where it is connected to the parts 6 of the pin proper is relatively thick and consequently the parts 6 of the pin proper are bowed slightly longitudinally, the inherent resiliency of the parts causing them to tend to straighten out and provide the aforesaid frictional locking engagement for the adjusting nut.

The plunger near its extremity is preferably formed with two oppositely arranged recesses 15 adjacent the cam surfaces which are engaged by corresponding projections 16 on the parts 6 when the plunger is in the operative position illustrated by Figure 3, thus preventing accidental withdrawal of the plunger as a result of vibration.

In the modified construction illustrated by Figures 4 to 6, a bowed spring 17 takes the place of the casing 1 and its associated nut 14. The parts 3 and 6 are similar in construction to those illustrated in Figures 1 to 3 and it is not therefore proposed to again describe them in detail. The parts 3 and 6 are riveted as at 18 to the spring 17 and as will be seen from Figures 5 and 6, the spring 17 is inwardly bowed as at 19, the arrangement being such that the spring engages the plate 7 at two spaced points when the locating pin is in position.

When the plunger is depressed, the inwardly bowed part 19 tends to straighten out as in Figure 6 as a result of pressure on the thumb piece thus causing the plate to be held firmly in contact with its associated frame. This action can be readily seen from a comparison of Figures 5 and 6.

Release of the locating pin is effected in a similar manner to the construction shown in Figures 1 to 3, the lever 10 being moved through approximately 90° in an anti-clockwise direction. It will be observed, however, that in the modified arrangement, the cam like surfaces of the lever engage the extremities of the parts 6, no casing being provided, the parts 6 as a result of withdrawal of the plunger once again assuming the position shown in Figures 4 and 5, thereby permitting the locating pin to be removed.

What I claim and desire to secure by Letters Patent of the United States is:

1. A locating pin comprising a pin proper of circular cross section composed of a plurality of parallel resilient parts for insertion in registering holes in a metal plate and a member to which the plate is to be riveted, a tapering plunger slidable in a lengthwise direction between said members for moving said parts into diverging relationship and into frictional engagement with the sides of the holes to maintain said holes in register and the plate held firm in position on the member with which it is associated, a casing, means within said casing for locating the parts of the pin proper against endwise movement said plunger being slidable within said casing from an inoperative position in which position the parts of the pin proper lie parallel, into an operative position in which the parts diverge, and a cam lever pivotally mounted on said plunger and acting as a thumb piece for use in pressing the plunger into its operative position, and as a lever actuated cam, the cam surface of which bears on the casing when the plunger is in its operative position, and thereby, on said cam lever being turned about its pivotal point, causes said plunger and parts of the pin proper to resume their original positions.

2. A locating pin comprising a pin proper of circular cross section composed of a plurality of parallel resilient parts for insertion in registering holes in a metal plate, and a member to which the plate is to be riveted, a tapering plunger slidable in a lengthwise direction between said members for moving said parts into diverging relationship and into frictional engagement with the sides of the holes, to maintain said holes in register, and the plate held firm in position on the member with which it is associated, a casing, a rivet extending diametrically through said casing and through holes formed in the parts of the pin proper, said rivet also passing through a longitudinal slot in the plunger, said plunger being capable therefore of limited sliding movement within said casing, and a cam lever pivotally mounted on said plunger and acting as a thumb piece for use in pressing the plunger into its operative position and as a lever actuated cam, the cam surface of which bears on the casing when the plunger is in its operative position, and thereby, on said cam lever being turned about its pivotal point causes said plunger and parts of the pin proper to resume their original positions.

3. A locating pin comprising a pin proper of circular cross section composed of a plurality of parallel resilient parts for insertion in registering holes in a metal plate and a member to which the plate is to be riveted, a tapering plunger slidable in a lengthwise direction between said members for moving said parts into diverging relationship and into frictional engagement with the sides of the holes to maintain said holes in register, and the plate held firm in position on the member with which it is associated, a casing, a rivet extending diametrically through said casing and through holes formed in the parts of the pin proper, said rivet also passing through a longitudinal slot in the plunger, said plunger being capable therefore of limited sliding movement within said casing, a nut in screw threaded engagement with said casing and formed with an opening at one end for the passage of the parts of the pin proper and plunger therethrough, said nut when the pin is in use contacting the plate, rotation of the nut in the appropriate direction thereby causing endwise movement of the casing and parts of the pin proper, and the diverging ends of the pin parts to be drawn firmly into engagement with the sides of the holes in the plate and plate receiving member, and a cam lever pivotally mounted on said plunger and acting as a thumb piece for use in pressing the plunger into its operative position, and as a lever actuated cam, the cam surface of which bears on the casing when the plunger is in its operative position, and thereby, on said cam lever being turned about its pivotal point causes said plunger and parts of the pin proper to resume their original positions.

4. A locating pin comprising a pin proper of circular cross section composed of a plurality of parallel resilient parts for insertion in registering holes in a metal plate and a member to which the plate is to be riveted, a tapering plunger slidable in a lengthwise direction between said parts for moving said parts into diverging relationship and into frictional engagement with the sides of the holes to maintain said holes in register, and the plate held firm in position on the member with which it is associated, a bowed spring having a central opening for the passage of the parts of the pin proper and plunger therethrough, the ends of the spring being connected by a rivet passing through holes formed in the parts of the pin proper and a longitudinally arranged slot in the plunger, the bowed spring engaging the plate and by virtue of its resiliency causing the diverging ends of the parts of the pin proper to be drawn firmly into engagement with the sides of the holes in the plate and plate receiving member, and a cam lever pivotally mounted on said plunger and acting as a thumb piece for use in pressing said plunger into its operative position, and as a lever actuated cam, the cam surface of which bears on the ends of the parts of the pin proper when they are in their diverging position, pivotal movement of said cam lever about its pivotal point thereby causing said plunger and parts of the pin proper to resume their original positions.

5. A locating pin comprising a pin proper divided longitudinally into a number of parts, a wedging member interposed between said parts, means common to and supporting said parts and wedging member, said wedging member being slidable longitudinally relatively to the said parts and being sandwiched between such parts so that yielding opposition is afforded to such sliding movement, and cam lever means for retracting the wedging member relatively to said parts for re-establishing normal unlocking relationship of the said parts and the wedging member.

CHARLES ELVY.

REFERENCES CITED

The following references are of record in the file of this patent:

UNITED STATES PATENTS

| Number | Name | Date |
| --- | --- | --- |
| 2,161,464 | Gilbert | June 6, 1939 |
| 2,188,450 | Verdon-Roe | Jan. 30, 1940 |
| 2,234,938 | Degener | Mar. 11, 1941 |
| 2,267,328 | Finkle | Dec. 23, 1941 |
| 2,303,260 | De Rebaylio | Nov. 24, 1942 |
| 2,350,630 | Melcher | June 6, 1944 |

FOREIGN PATENTS

| Number | Country | Date |
| --- | --- | --- |
| 533,984 | Great Britain | Feb. 25, 1941 |